(12) United States Patent
Sakano et al.

(10) Patent No.: US 7,257,825 B2
(45) Date of Patent: Aug. 14, 2007

(54) DISC CHANGER, METHOD OF DETECTING MODE THEREOF, AND METHOD OF SELECTING DISC EJECTION

(75) Inventors: Kenji Sakano, Fukui (JP); Masahiko Nishide, Fukui (JP); Yuichi Kobayashi, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 481 days.

(21) Appl. No.: 10/855,591

(22) Filed: May 28, 2004

(65) Prior Publication Data

US 2004/0240331 A1 Dec. 2, 2004

(30) Foreign Application Priority Data

May 30, 2003 (JP) ............................. 2003-153597
Jun. 27, 2003 (JP) ............................. 2003-184668

(51) Int. Cl.
*G11B 17/05* (2006.01)
(52) U.S. Cl. .................................................. 720/614
(58) Field of Classification Search ................ 720/614, 720/615; 360/30.78, 30.84, 30.85, 98.01, 360/98.04, 98.05
See application file for complete search history.

(56) References Cited

U.S. PATENT DOCUMENTS

| | | | | |
|---|---|---|---|---|
| 5,210,728 A | * | 5/1993 | Noguchi et al. | 369/30.78 |
| 5,265,078 A | * | 11/1993 | Akiyama et al. | 369/30.78 |
| 5,280,463 A | * | 1/1994 | Okajima et al. | 369/30.84 |
| 6,545,967 B2 | * | 4/2003 | Kubokawa | 720/615 |
| 2003/0161225 A1 | * | 8/2003 | Morioka et al. | 369/30.85 |
| 2004/0017741 A1 | * | 1/2004 | Tatehata et al. | 369/30.85 |

FOREIGN PATENT DOCUMENTS

| | | |
|---|---|---|
| JP | 10-134474 | 5/1998 |
| JP | 2002-243015 | 8/2002 |

* cited by examiner

*Primary Examiner*—Tianjie Chen
(74) *Attorney, Agent, or Firm*—Wenderoth, Lind & Ponack, L.L.P.

(57) ABSTRACT

To provide a disc changer capable of working without any malfunctions in spite of a reduced number of switches, it includes a mode-detecting mechanism having means for identifying an operation, cams respectively operated by powers supplied from a first and second motors, each cam provided with said identifying means, sensors for detecting said identifying means moving according to the operation of said cam, each composed of a set of a light-emitting element and a light-receiving element, a control section for receiving operation signals detected by said sensors to control the operation of the disc changer, and transmission gears for driving said cams, said transmission gears interlocking with a transporting gear meshing with a rack of said main tray for carrying the main tray out with the subtray put thereon.

5 Claims, 8 Drawing Sheets

DISC CHANGER, METHOD OF DETECTING MODE THEREOF, AND METHOD OF SELECTING DISC EJECTION

BACKGROUND OF THE INVENTION

1. Field of the Invention

The present invention relates to a disc changer, and a method of detecting a mode thereof, and a method of selecting a disc ejection. The disc changer is capable of storing optical disc recording media including CDs (Compact Discs) and DVDs (Digital Versatile Discs) and automatically recording and reproducing a selected recording medium of the stored media. Also, the disc changer is of a tray-transport type having a plurality of subtrays for transporting a recording medium set thereon.

2. Related Art

Disc changer is capable of storing a plurality of optical disc recording media including CDs, and selecting one of the stored optical disc recording media to perform recording and reproducing of the selected one. This kind of disc changers are widely used and provided in various forms. However, disc changer need many operations to accommodate a plurality of discs and select a disc out of them for recording and reproducing the selected one, and to replace the selected disc with another one, which inevitably increases the number of motors the disc changer has. Conversely, when a structure is adopted such that the number of the motors is limited, the operations are performed selectively and as such, various kinds of sensors and a mechanism for switching powers are required.

For example, "Rotation transmission change-over mechanism" according to JP-A-2002-243015 is arranged so that a single motor carries out both eject operation (operation of transporting a carriage or a subtray to its disc replacement position) and play operation (operation of transporting the carriage to its disc reproduction position), and a driving path is switched by a plunger. The mechanism includes: a plunger with a lever for transferring a rotation gear toward the direction of the rotational axis; carriages superposed one on another and installed so that the eject operation or play operation is enabled when the operation is selected; a driving means for the eject operation and the play operation; an operation switching means for switching operational transmission to a selected operation of the eject operation and the play operation; and an operation-transmitting means for carrying out eject operation or play operation, wherein one of a first gear or a second gear is connected to the operation switching system and the other gear is connected to the operation-transmitting system. Then, the rotation gear is adjusted in its rotating position and engaged or removed so that it meshes with one of first and second switching gears.

However, use of the plunger causes a noise with each switching, raises the cost of components, and increases the power consumption, which poses heat-producing and fire hazards. Also, it increases electrical lines and circuit boards and inevitably enlarges size of the device. In addition, there is an apprehension that a magnetic field generated by the plunger influences other components.

Incidentally, in a tray-transport type disc changer the following main operations are generally carried out in order to select, record, and reproduce one of disc-type recording media stored therein.

(1) Operation of transporting a tray in a disc replacement position (disc-removing position) to a disc waiting position.

(2) Operation of vertically moving a traverse unit to the position where a tray with a selected disc placed thereon is located.

(3) Operation of transporting the tray with the selected disc placed thereon to a disc reproduction position.

(4) Operation of clamping, recording and reproducing the disc.

(5) Operation of transporting the tray located in the disc reproduction position to the disc waiting position.

(6) Operation of selecting a tray located in the disc waiting position and transporting the tray to the disc replacement position (disc-removing position).

In a disc changer, it is required to grasp which operation step the selected given disc is in and then proceed to a next operation step. The operation may be stopped in the case where a trouble occurs in the operations described in (1) to (6) under some influence, or in midstream. Further, various operations are performed in the case where it is required to bring out a disc during the operation of reproducing the disc, and other cases. Furthermore, various troubles may occur and as such, it is required to check a current operation correctly because, otherwise it becomes impossible to continue subsequent operations. Also, even in a process of reproducing a disc, it is required to perform the operation of ejecting a disc in the waiting position to replace it with another one.

"Disc reproducing device with a disc changer" according to JP-A-10-134474 is arranged so that a single motor is used as a driving source to carry out both the operation of transferring a disc tray for replacement of the disc and the operation of transferring a disc tray for disc loading, and the device is simplified in a power-transmission switching mechanism. However, the disc reproducing device has eight microswitches to identify the operations. Use of the contact-type microswitches produces variations in form and size in contact areas, thereby reducing the detection accuracy. The disc reproducing device with the disc changer uses three subtrays and eight lever switches. In the case where the number of subtrays is increased, the number of detecting operations is increased and therefore it is required to increase the number of microswitches.

Further, a switch lever portion can contact another component to become deformed. In such case, the switch can not function whatsoever. Therefore, the more the switches, the load on the microcomputer becomes heavier. Consequently, the microcomputer used to cope with such situation becomes more expensive. In addition, an increase of the number of switches increases the numbers of wiring materials and boards, which makes the device more complicated. As a result, the disc changer becomes more complex and more expensive as a whole.

Conventional disc changers have problems as described above. The problems to be solved by the invention are these problems. It is an object of the invention to provide a disc changer, which is capable of working without any malfunctions in spite of a reduced number of switches and which has a simple structure and can be manufactured at low cost, a method of detecting a mode thereof, and a method of selecting a disc ejection.

SUMMARY OF THE INVENTION

Therefore, a disc changer according to the invention is a disc changer capable of selecting a disc set on a desired subtray among a plurality of subtrays and recording and reproducing the disc, including: a device frame; the plurality of subtrays; a main tray for accommodating said subtrays, accommodated in said device frame; a first motor for driving said main tray; a second motor for driving said subtrays; and a mode-detecting mechanism including means for identifying an operation, cams respectively operated by powers supplied from said first and second motors, each cam provided with said identifying means, sensors for detecting said identifying means moving according to the operation of said cam, each composed of a set of a light-emitting element and a light-receiving element, a control section for receiving operation signals detected by said sensors to control the operation of the disc changer, and transmission gears for driving said cams, said transmission gears interlocking with a transporting gear meshing with a rack of said main tray for carrying the main tray out with the subtray put thereon.

The light-receiving and light-emitting elements are of non-contact type. The control section composed of a microcomputer counts signals detected in parallel by both the light-receiving element and the light-emitting element to check and control the operation of the disc changer.

The cam and transmission gear for driving the cam may be integrally formed into a gear cam, whereby the configuration of the disc changer can be simplified.

The identifying means may be a light-blocking member formed on the gear cam; the light-blocking member passes between the light-emitting element and the light-receiving element by rotating the gear cam, whereby the operation signals can be detected. The light-blocking member may be a notched rib formed concentrically with the gear. When the gear cam is rotated, the light emitted by the light-emitting element is blocked by the rib, otherwise passes through the notched portion to reach the light-receiving element. In the disc changer, the control section handles a region where the notched portion coincides with the sensor in position in a rotating direction of the gear cam as OFF state where light from the light-emitting element can reach the light-receiving element, and a region where the light is blocked by the rib as ON state to control the operation of the disc changer.

In the disc changer, each of the cams, which is respectively operated by powers supplied from the motors, is thus provided with the identifying means, and a method of detecting a mode is adopted such that a sensor composed of a set of a light-emitting element and a light-receiving element is used to count a number of times the identifying means passes by the sensor as each of said cams rotates, thereby to detect and control the operation of the disc changer. According to such method, numbers of ON and OFF states produced by the rotation of the cam with respect to the reference location thereof are counted, which enables a given control of the operation. Therefore, many types of operation control can be set even with a small number of sensors. For example, a subtray to be ejected can be selected by counting the number of times the identifying means passes by the sensor. The identifying means may be provided in a rearmost region of the gear cam with respect to the reference location thereof, as a means for selecting a subtray to be ejected.

However, in the invention the concrete operations of the disc changer are not limited particularly. More specifically, concrete control operations vary depending on the model type of the disc changer and its structure and as such, the number of counts for a given operation is predetermined, whereby the given operation can be performed at the time when the predetermined count number is achieved. The embodiments according to the invention will be described in detail below in reference to the drawings.

DETAILED DESCRIPTION OF PREFERRED EMBODIMENT

Figure 1:
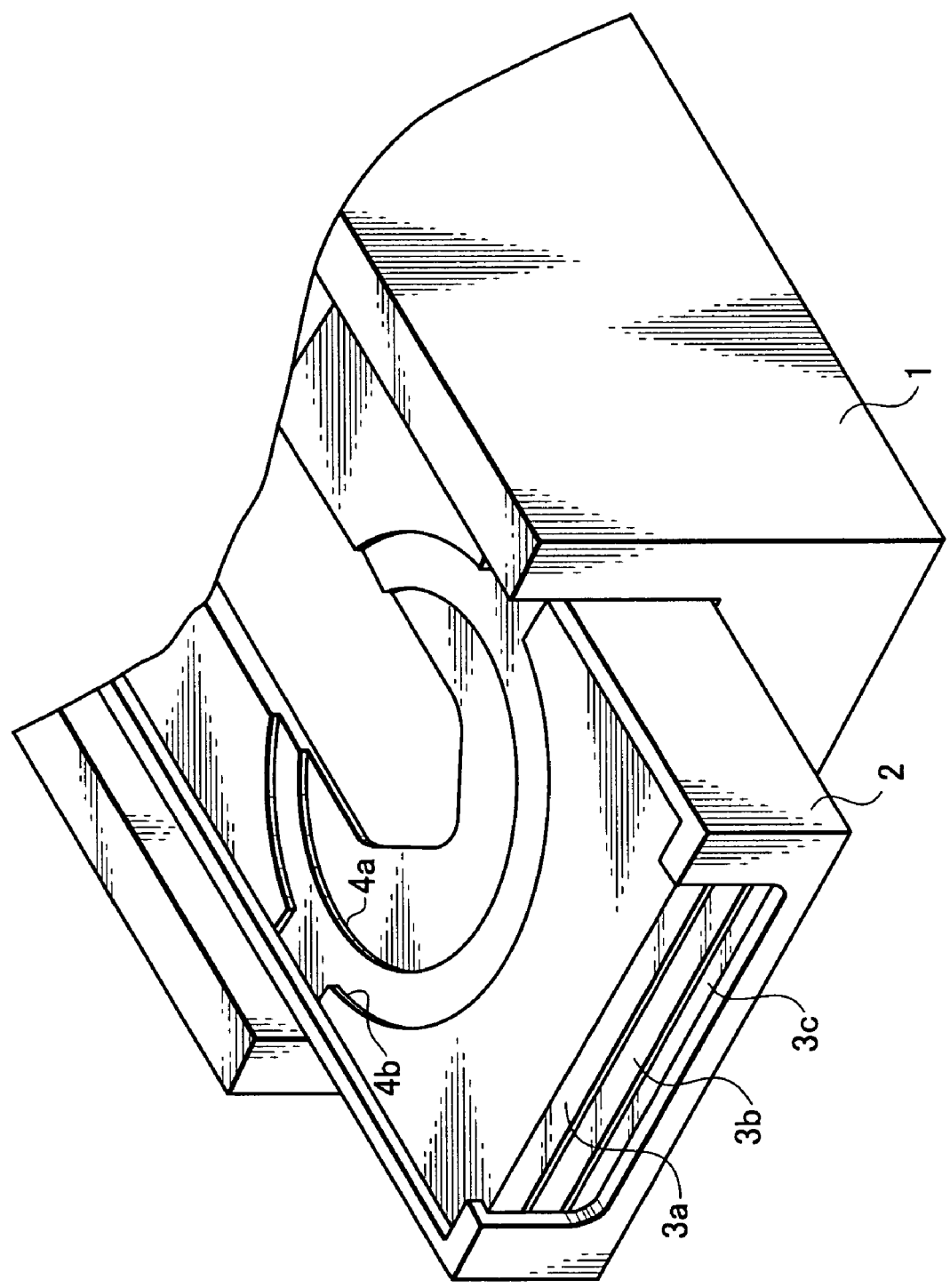
FIG. 1 is a perspective view partially showing an appearance of the disc changer.

FIG. 1 is a partial external view of the disc changer, showing the situation where a main tray is withdrawn. In the drawing, the reference numeral 1 represents a device frame; the reference numeral 2 represents the main bay; and the numeral 3 represents each of three subtrays 3a, 3b, and 3c accommodated in the main tray 2. Each of the subtrays 3a, 3b, and 3c is formed with steps as outer edges 4a, 4b for the purpose of allowing two types of discs, i.e. large-sized and small-sized discs, to be placed thereon.

In the cases where a disc is placed on and removed from each of subtrays 3a, 3b, 3c, the subtray located above the intended subtray is locked to the device frame 1 and the main tray 2 is transported to a disc replacement position together with the subtrays located on the lower side. The subtrays 3a, 3b, 3c are accommodated in the main tray 2 like this, and they are brought out of and into the device frame 1 together with the main tray 2.

As shown in the drawing, the main tray 2 is can be protruding and is located between the disc replacement position (disc-removing position) and the disc waiting position. Also, the main tray 2 accommodates two subtrays 3b and 3c, and allows a disc to be placed on the subtray 3b located in the middle stage. The main tray 2 is retreated from the disc replacement position and accommodated in the device frame 1 to be transported to the disc waiting position.

In the case where a disc placed on the lower-stage subtray 3c is replaced, the upper-stage subtray 3a and the middle-stage subtray 3b are locked to the device frame 1. Further, in the case where a disc placed on the upper-stage subtray 3a is replaced, the middle-stage subtray 3b or the lower-stage subtray 3c is locked and the locked subtray is not transported to the disc replacement position by the main tray 2.

Figure 2A:
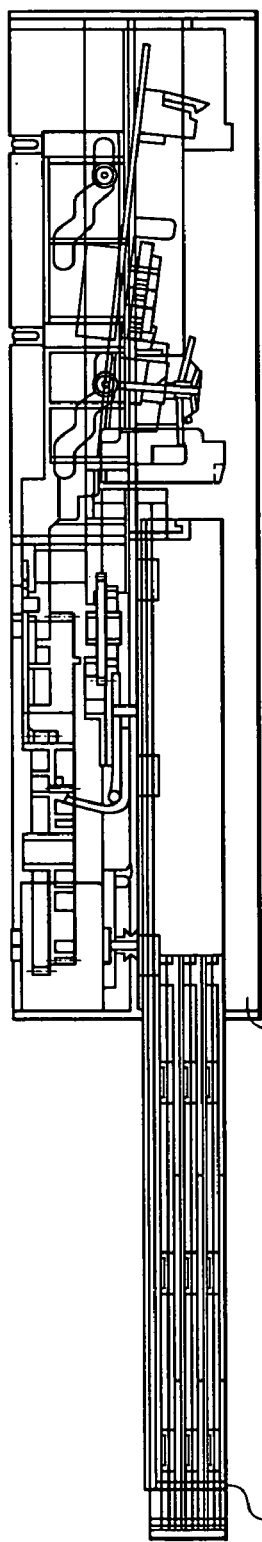
FIG. 2(a) is a transverse sectional view showing an internal structure of the disc changer.
Figure 2B:
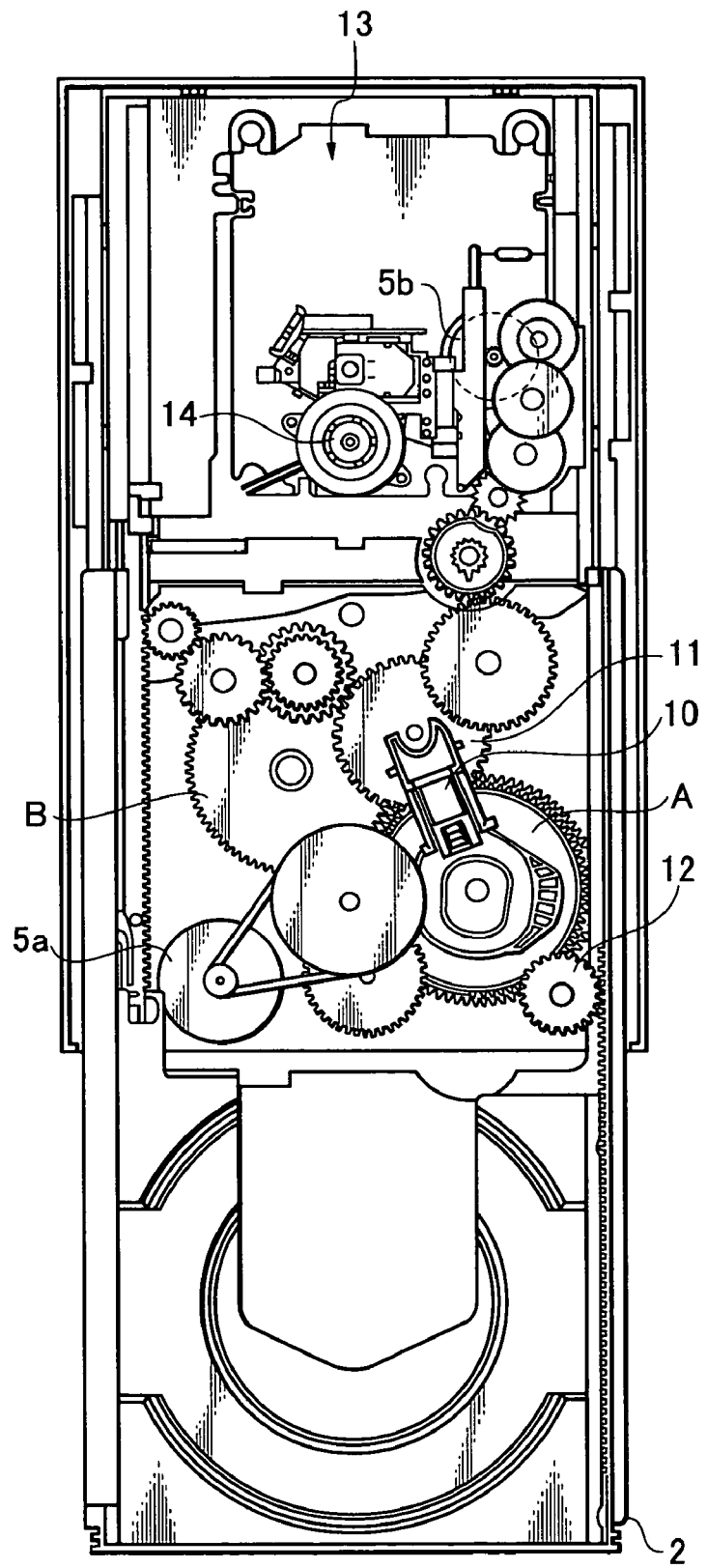
FIG. 2(b) is a longitudinal sectional view of the disc changer.

FIGS. 2(a) and 2(b) show an internal structure of the disc changer. In the drawings, there is shown the situation where the main tray 2 is withdrawn from the device frame 1. The structure illustrated in the drawings can be classified into three regions according to the disc positions. More specifically, the structure is classified into the disc replacement position, disc waiting position, and disc reproduction position from the near side of the drawings, in order. In the case where discs have been set in the subtrays 3a, 3b, and 3c, when the main tray 2 is retreated and accommodated in the device frame 1, the discs are brought into the disc waiting position.

The discs in the disc waiting position are transported to the disc reproduction position behind the waiting position together with the respective subtrays and loaded on a turntable 14 of the traverse unit 13. After that, recording and reproducing of the discs are performed. For the purpose of this, the traverse unit 13 with the turntable 14 is transported and moved up and down directions so as to be aligned with the position of the subtray and thus it becomes possible to load the disc located on a given subtray selectively retreated.

The disc changer of the invention includes two gear cams A and B. The gear cam has ribs on the bottom thereof, which are arranged concentrically and extend downward. Moreover, the ribs are notched in places and as such, the light emitted from a light-emitting element of a sensor can reach a light-receiving element thereby to detect an operation signal or the light can be blocked. The disc changer is arranged so that a control section composed of a microcomputer can count a signal detected by both the light-receiving element and the light-emitting element thereby to check and control some operation.

The gear cam A and the gear cam B are driven and rotated by motors 5a and 5b. The gear cam A controls the following operations to be performed correctly: driving the main tray 2; selecting a disc in disc ejection; and controlling the power switching by a lever clutch for moving the traverse unit up and down and moving the subtray to the reproduction position. In contrast, the gear cam B controls the following operations so to be performed correctly: driving the subtray; and selecting a disc to be reproduced. In the invention, the motor 5b for driving the subtray and selecting a disc to be reproduced is different from the motor 5a for driving the main tray and selecting a disc in disc ejection.

Figure 3:
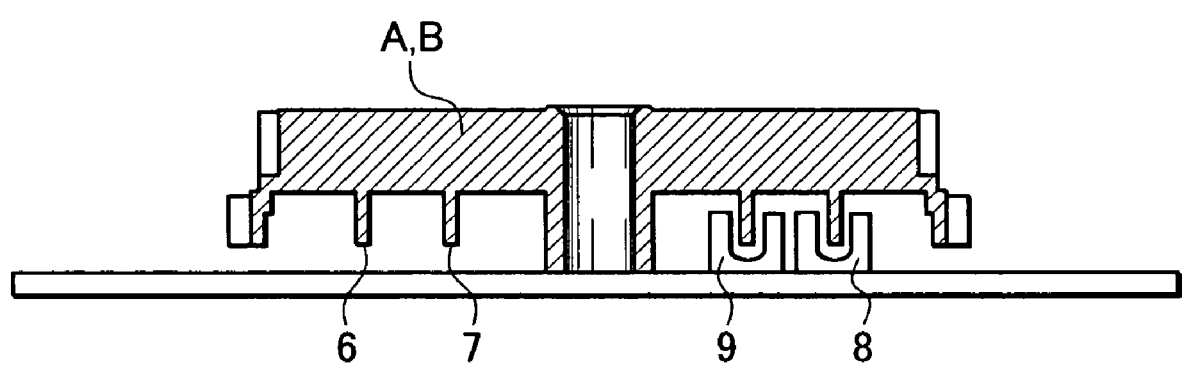
FIG. 3 is a longitudinal sectional view showing a form resulting from the combination of ribs provided on a gear cam and the corresponding sensors.

FIG. 3 shows an embodiment of a mode-detecting mechanism according to the invention. As shown in FIG. 3, the ribs 6, 7 are concentrically formed on the bottom side of each of the gear cams A, B, and the ribs 6, 7 are combined with the respective sensors 8, 9. Each of the sensors is arranged to have a set of a light-emitting element and a light-receiving element and light emitted from the light-emitting element can be received by the light-receiving element. However, the ribs 6, 7 block light from the light-emitting element and thus the light cannot reach the light-receiving element.

Therefore, each of the ribs 6, 7 is provided with notches in places, through which light from the light-emitting element can reach the light-receiving element. The sensors 8, 9 are attached on a printed wiring board. When the gear cams A, B rotate about the axes thereof, the notched portions formed in the ribs 6, 7 pass through a given place, whereby light from the light-emitting element can reach the light-receiving element. The signal thus produced is sent to the microcomputer of the control section and counted there. Consequently, this enables the control for the disc-ejecting operations of the lever clutch, main tray, and subtrays.

Figure 4:
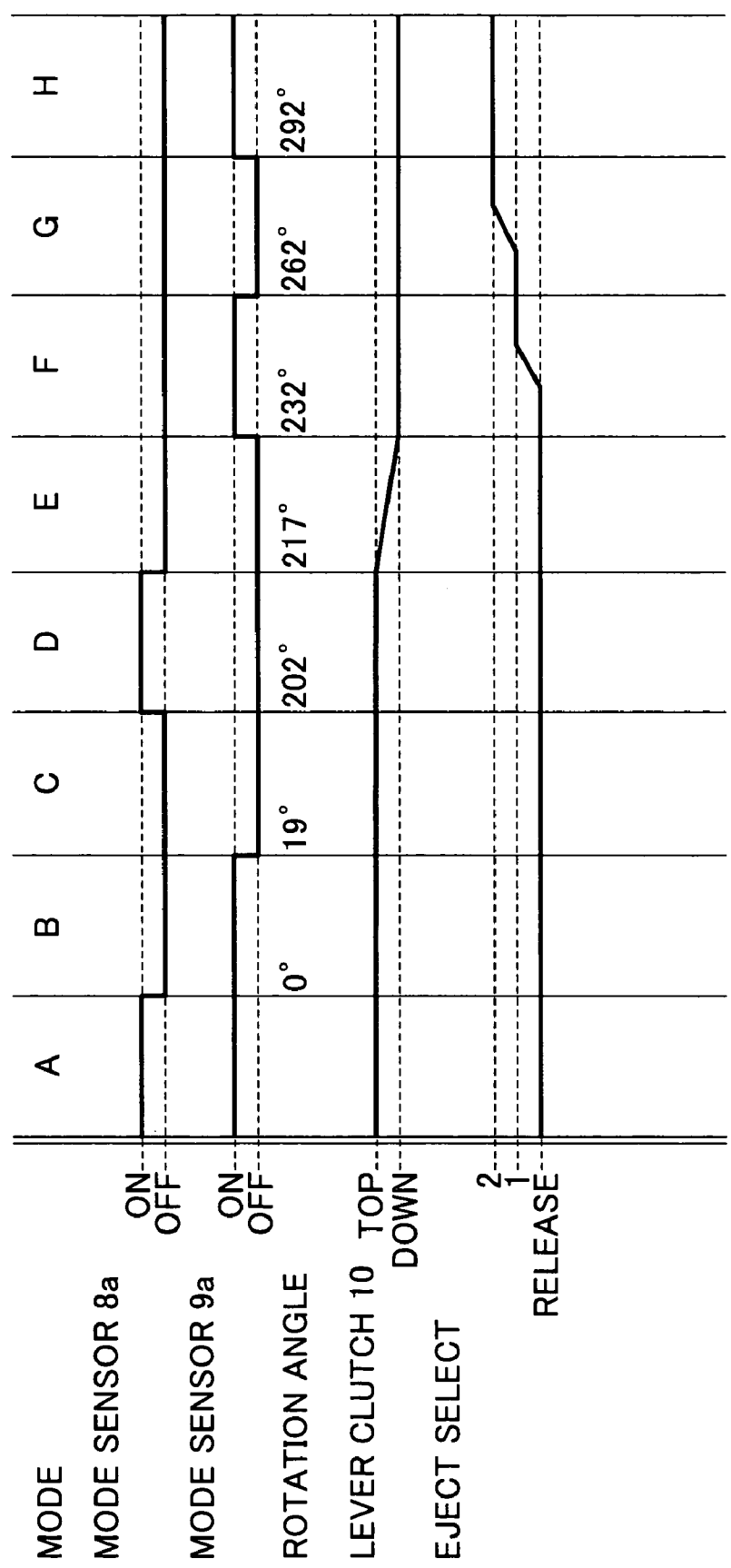
FIG. 4 is a table for modes of the gear cam A.

FIG. 4 shows a table for modes of the gear cam A, wherein rotation angles of the gear cam A are classified into segments A to H. In the drawing, A represents a region up to 0° in reference angle; B represents a region from 0° to 19°; C represents a region from 19° to 202°; D represents a region from 202° to 217°; E represents 217° to 232°; F represents from 232° to 262°; G represents a region from 262° to 292°; and H represents a region over 292°.

In the regions A and D light from the light-emitting element is blocked by the rib 6a and the mode sensor 8a is in ON state; in the other regions the light can pass through the rib 6a and reach the light-receiving element. Further, in the regions A, B, F, and H light from the light-emitting element is blocked by the rib 7a and the mode sensor 9a is in ON state; in the other regions the mode sensor 9a is in OFF state because the light can pass through the rib 7a. Light signals from the two mode sensors are converted into electrical signals and then sent to the microcomputer of the control section to actuate the lever clutch and the eject-selecting mechanism.

(B→A) To Complete Ejection of the Main Tray

At the time when the sensor 8a changes from OFF to ON, the ejection of the main tray is completed.

(B→C) To Drive the Motor

Pushing the leading end of the main tray 2 by a finger causes the main tray 2 to slide rearward, and the motor 5a is driven to rotate and transports the main tray 2 to the waiting position at the time where the sensor 9a is switched from ON to OFF.

(C→D) Main Tray on Standby

At the time when the sensor 8a changes from OFF to ON, the main tray 2 is stopped in the waiting position.

(D→E) To Start the Operation of the Lever Clutch

The sensor 8a is switched from ON to OFF, thereby to start the swing motion of the lever clutch 10 in order to switch the gear clutch 11 (see FIG. 2).

(E→F) To Complete the Down of Lever Clutch

The sensor 9a is switched from OFF to ON, whereby the down of the lever clutch 10 is completed to switch the gear clutch 11.

(F→G) To Select Disc Ejection 1

The sensor 9a is switched from ON to OFF, thereby to lock the upper-stage subtray 3a and prevent the subtray 3a from being transported to the disc-removing position together with the main tray 2.

(G→H) To Select Disc Ejection 2

The sensor 9a is switched from OFF to ON, thereby to lock the upper-stage and middle-stage subtrays 3a and 3b and prevent the subtrays 3a, 3b from being transported to the disc-removing position together with the main tray 2.

Figure 5:
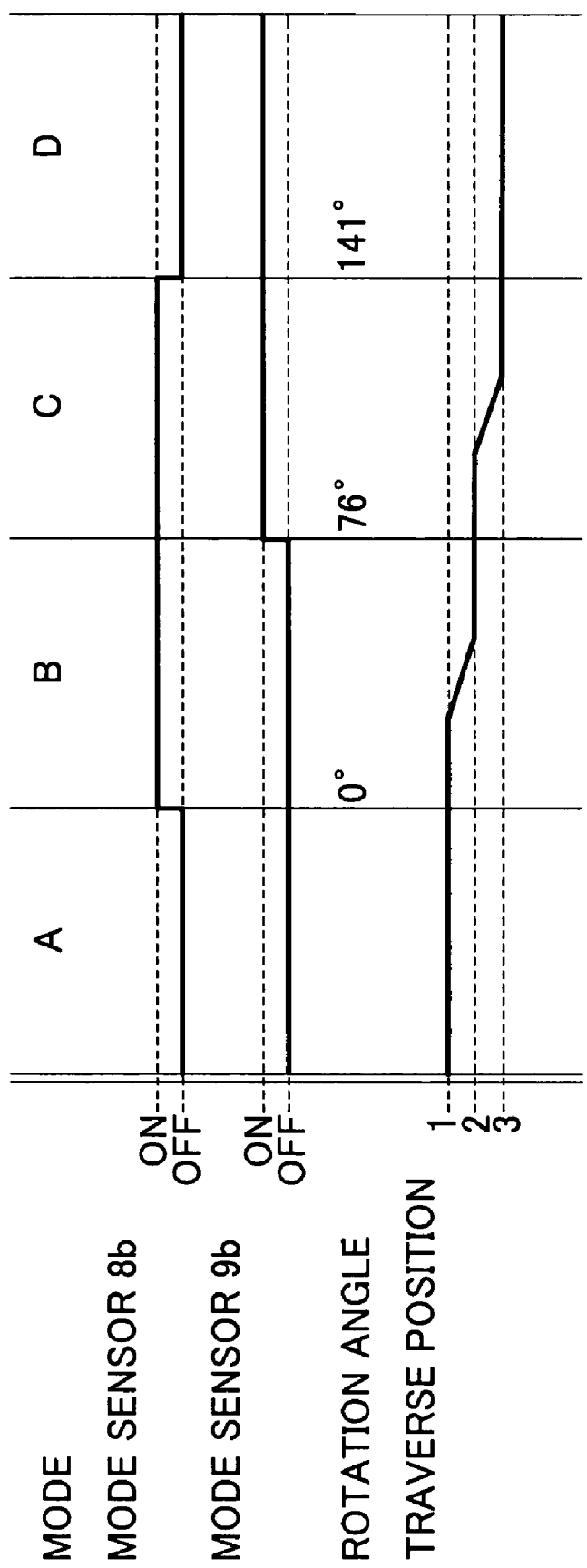
FIG. 5 is a table for modes of the gear cam B.

Likewise, FIG. 5 shows a table for modes of the gear cam B. Rotation angles of the gear cam B are classified into segments A to D. In the drawing, A represents a region up to 0° in reference angle; B represents a region from 0° to 76°; C represents a region from 76° to 141°; D represents a region over 141°. In the regions B and C the mode sensor 8b is in ON state and therefore light from the light-emitting element is blocked by the rib 6b; in the other regions the light can reach the light-receiving element. Further, another mode sensor 9b is in ON state in the regions C and D, and therefore light from the light-emitting element is blocked by the rib 7b; in the other regions the light can reach the light-receiving element.

Light signals from the two mode sensors are converted into electrical signals and then sent to the microcomputer of the control section, whereby the position of the traverse unit can be changed. More specifically, the traverse unit is located in the position (1) in the region A, the unit moves from the position (1) to (2) in the region B, the unit moves from the position (2) to (3) in the region C, and the unit is located in the position (3) in the region D.

Figure 6:
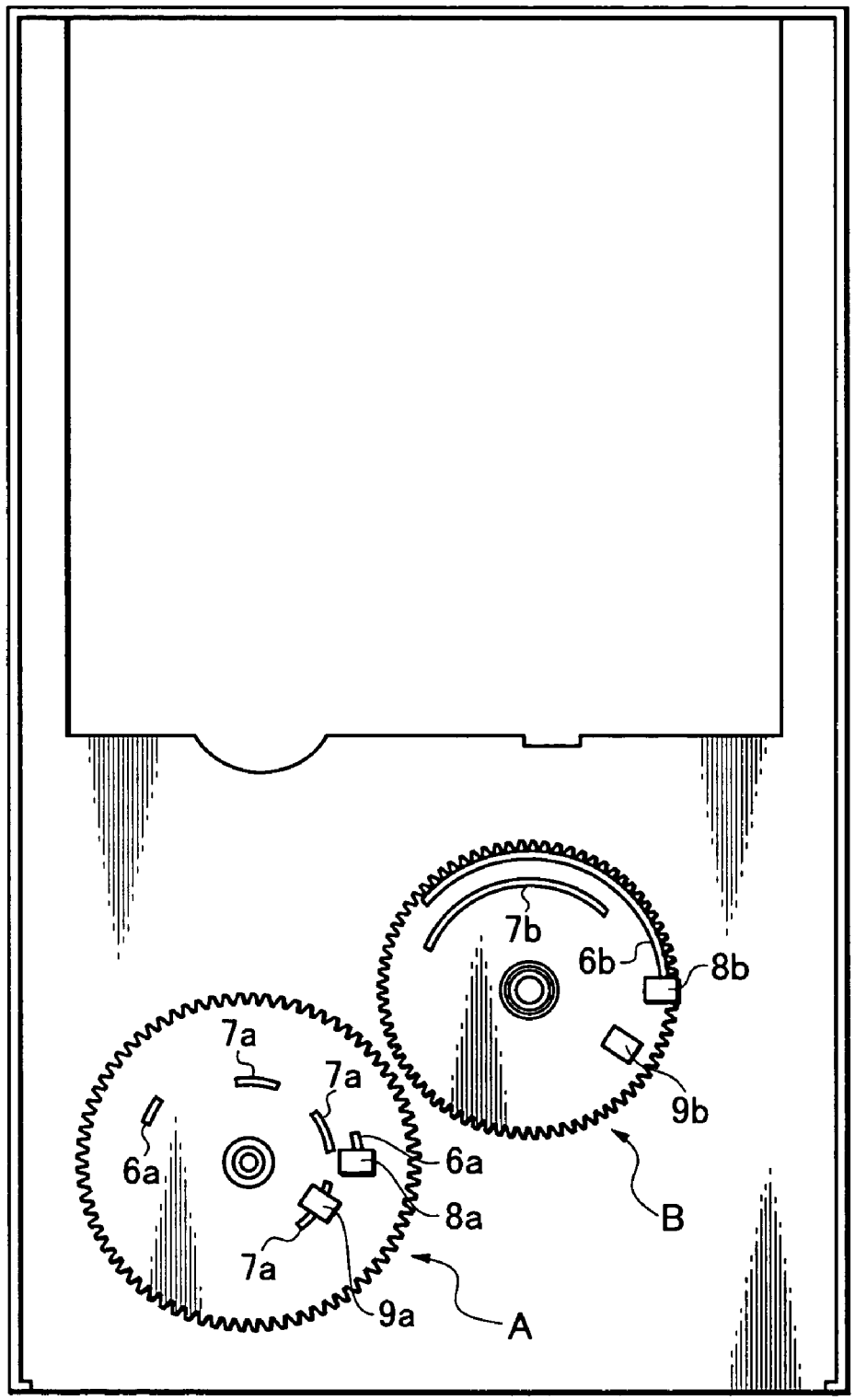
FIG. 6 is a plan view showing the relation of arrangement between the gear cams A and B.

FIG. 6 shows the way the gear cams A and B are positioned. The drawing is a bottom view of the disc changer, wherein the gear cam A is used in combination with two sensors 8a and 9a and the gear cam B is used in combination with two sensors 8b and 9b. The gear cam A is provided with the rib 6a. In addition, the gear cam A has a plurality of ribs 7a provided inwardly in the radial direction thereof. Likewise, the gear cam B is provided the rib 6b and it has the rib 7b inwardly in the radial direction thereof.

Referring to FIGS. 7(a)-7(f), there are shown the modes involved in the rotation of the gear cam A. The details of the drawings are as follows.

Figure 7A:
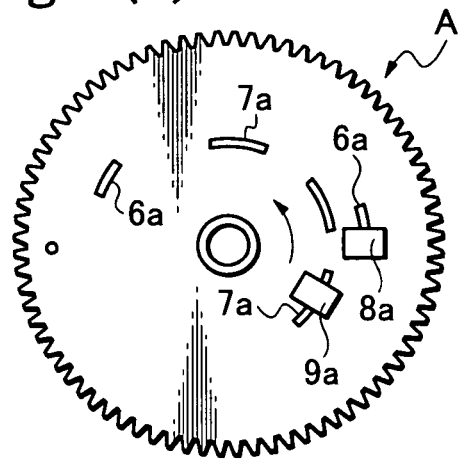
FIGS. 7(a)-7(f) are plan views showing mode variation involved in the rotation of the gear cam A.

(a) FIG. 7(a) shows a position when the ejection is completed.

Pressing an ejection button causes the gear cam A to rotate by rotating the motor 5a and concurrently causes the gear 12 to rotate. Then, when the gear cam is brought to the position illustrated in FIG. 7(a), the rotation of the motor 5a is stopped and the ejection of the main tray is completed.

Figure 7D:
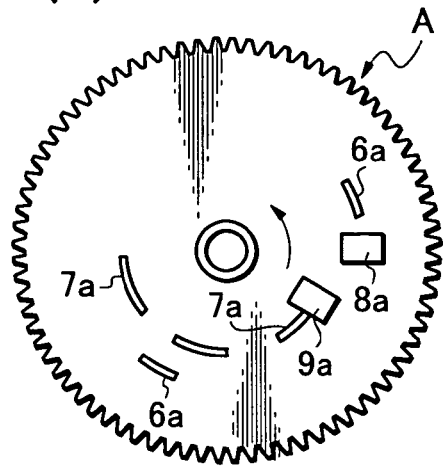
Figure 7B:
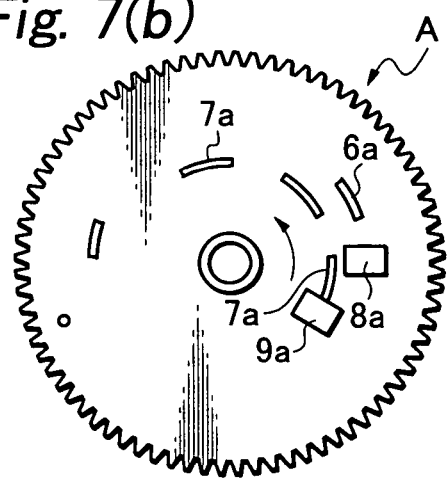

(b) FIG. 7(b) shows a start position.

Pushing the leading end of the main tray 2 by a finger causes the main tray 2 to slide and retreat. At the time when the gear cam A is rotated counterclockwise to be brought to the position illustrated in FIG. 7(b), the motor 5a runs and the main tray 2 is retracted automatically.

Figure 7E:
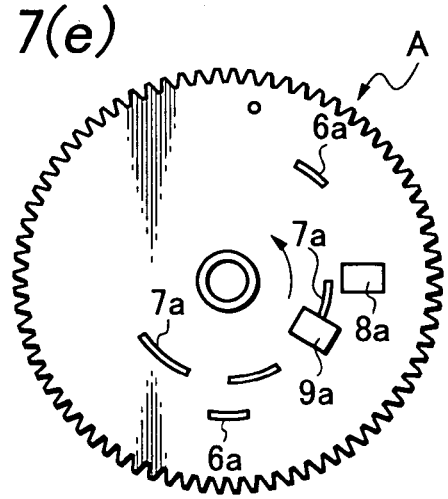
Figure 7C:
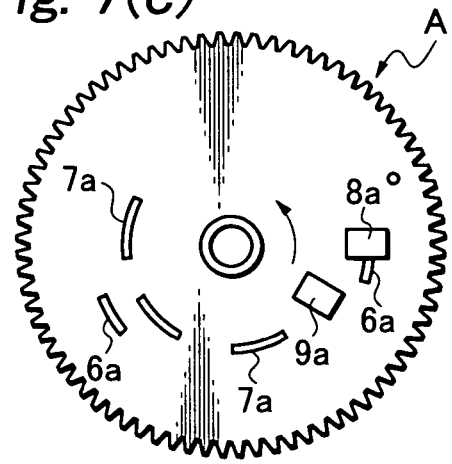

(c) FIG. 7(c) shows a waiting position.

When the motor 5a runs, the gear 12 is rotated. Thus, the main tray 2 is stored in the waiting position and brought into a standby position for proceeding to the recording and reproducing operations.

(d) FIG. 7(d) shows a lever clutch-downed position.

The gear clutch 11 mounted on the leading end of the lever clutch 10 is meshed with the gear cam B by downing the lever clutch, whereby the traverse unit 13 can be moved up and down and stopped at a given position. The lever clutch 10 is operated by pressing an operation button on the front panel of the disc changer in order to select a disc to be recorded or reproduced.

(e) FIG. 7(e) shows disc ejection 1.

In the case where a disc is replaced, the upper-stage subtray 3a is locked to prevent it from being ejected together with the main tray 2. When the operation button on the front panel is pressed, the gear cam A is rotated. Then, a given subtray 3a is selected when the gear cam A reaches this position.

Figure 7F:
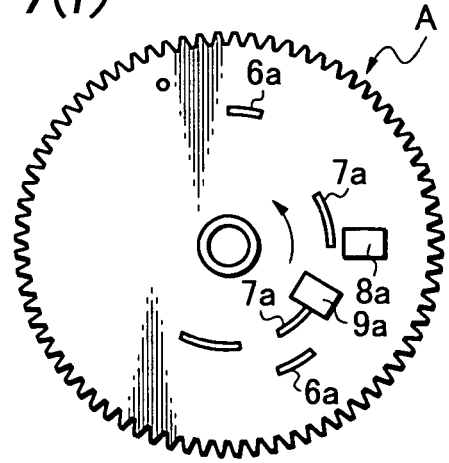

(f) FIG. 7(f) shows disc ejection 2.

In the case where a disc is replaced, the upper-stage and middle-stage subtrays 3a and 3b are locked to prevent them from being ejected together with the main tray 2. When the gear cam A is further rotated to reach the position illustrated in FIG. 7(f), the subtrays 3a and 3b are selected. Further, if the main tray 2 is ejected, the disc placed on the subtray 3c can be replaced, which is located in the lower-stage and a surface of which is exposed.

Figure 8A:
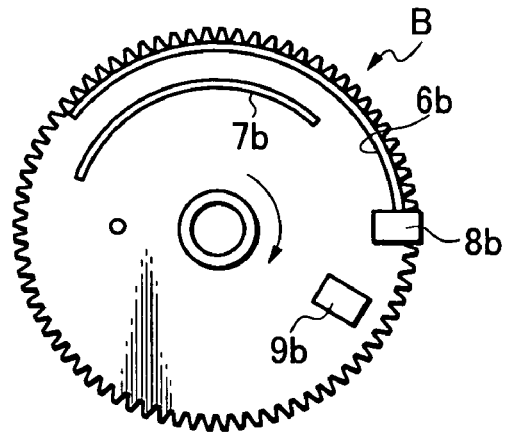
FIGS. 8(a)-8(c) are plan views showing variations in mode involved in the rotation of the gear cam B.
Figure 8B:
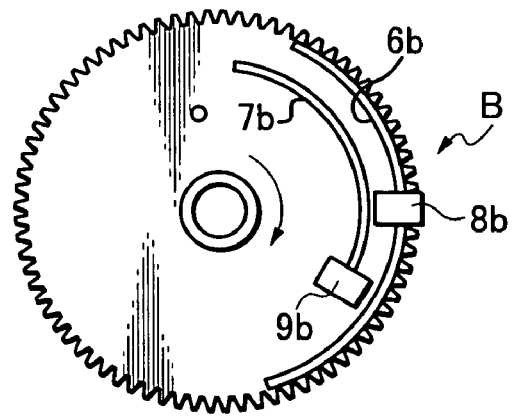
Figure 8C:
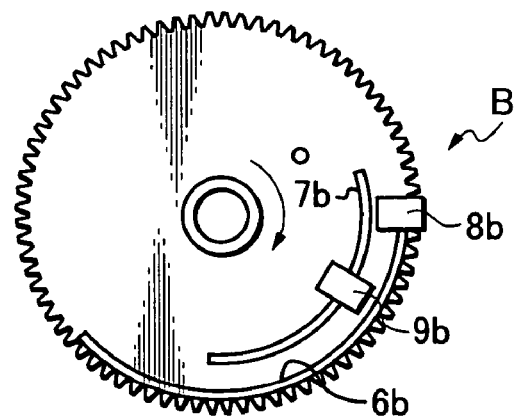

Referring to FIGS. 8(a)-8(c), there are shown the modes involved in the rotation of the gear cam B.

(a) In the position illustrated in FIG. 8(a), the outer rib 6b has reached the sensor 8b, when the signals of the sensor are sent to the microcomputer of the control section to select the subtray 3a. Then, the disc set in the subtray 3a is recorded and reproduced.

(b) In the position illustrated in FIG. 8(b), the gear cam B is further rotated, and thus the inner rib 7b reaches the sensor 9b. The signals of the sensor 9b are sent to the microcomputer to select the subtray 3b. Then, the disc set in the subtray 3b is recorded and reproduced.

(c) In the position illustrated in FIG. 8(c), the gear cam B is further rotated, and thus the outer rib 6b is spaced away from the sensor 8b. The signals of the sensor 8b are sent to the microcomputer to select the subtray 3c. Then, the disc set in the subtray 3c is recorded and reproduced.

Three subtrays are accommodated in the disc changer illustrated in FIG. 1. However, also in the case where there are four or five subtrays, the gear cam A may be provided with additional ribs 6, 7, . . . in the same way as the foregoing, in a final step following the step for forming the above-described ribs, in preparing the gear cam A. In this case, a subtray, which is to be locked to prevent the ejection thereof, may be selected by detecting the ribs 6, 7, . . .

While the gear cam A is a control means to select and eject one of the subtray 3a, 3b, . . . , such means is not limited to the gear cam A. A cam capable of sliding back and forth may be provided with a hole through the cam. In this case, the subtray to be ejected can be selected by counting the number of times the sensor passes by the hole. Therefore, it is possible to adopt a structure such that a gear meshing with the cam is engaged with the rack of the main tray.

Therefore, the gear cams A and B may be provided with notched ribs, whereby the light passing through the notched ribs can be detected. Further, it is possible to change the forms of the notched ribs, the number or locations of notched portions, the notched length thereof, etc. variously depending on the operation to be controlled.

As described above, a disc changer, a method of detecting a mode, and a method of selecting a disc ejection according to the invention, are characterized by: a means for identifying an operation formed on the cam; a structure such that the means for identifying an operation is detected by a sensor; and rotating or sliding the cam thereby to count the number of times the sensor detects and passes by the means for identifying an operation and consequently control the operation of the disc changer so as to select and eject a given subtray. The invention can provide the following advantages.

(Advantage of the Invention)

According to the invention, the number of sensors required to control the disc changer is reduced and the cost is decreased correspondingly. For example, in the case of a disc changer with three discs stored therein, it can be controlled by four sensors instead of eight sensors in conventional cases. In addition, it is not required to increase the number of sensors even when the number of discs is increased.

The sensors are of a non-contact type, which are turned ON or OFF when the lights emitted from light-emitting elements are received by the respective light-receiving elements, and which are increased in detection accuracy and superior in durability. In addition, the number of the sensors is reduced, whereby the codes of the microcomputer can be reduced. This reduces the load on the microcomputer.

In the case where selecting and controlling a subtray to be ejected with the cam, the region therefor is provided after the regions for controlling the other operations and as such, it is possible to eject a disc in waiting to replace it with another disc even in a process of reproducing a disc.

Since the rearmost region of the cam is utilized, it is also possible to cope with the case where the number of subtrays, on which a disc is placed, is increased or decreased without modifying a portion used for controlling another operation.

What is claimed is:

1. A disc changer capable of selecting a disc set on a desired subtray among a plurality of subtrays and recording and reproducing the disc, comprising:
   a device frame;
   the plurality of subtrays;
   a main tray for accommodating said subtrays, accommodated in said device frame;
   a first motor for driving said main tray;
   a second motor for driving said subtrays; and
   a mode-detecting mechanism including means for identifying an operation, cams respectively operated by powers supplied from said first and second motors, each cam provided with said identifying means, sensors for detecting said identifying means moving according to the operation of said cam, each composed of a set of a light-emitting element and a light-receiving element, a control section for receiving operation signals detected by said sensors to control the operation of the disc changer, and transmission gears for driving said cams, said transmission gears interlocking with a transporting gear meshing with a rack of said main tray for carrying the main tray out with the subtray put thereon.

2. The disc changer of claim 1, wherein said cam and transmission gear for driving said cam are integrally formed into a gear cam.

3. The disc changer of claim 2, wherein said identifying means is a light-blocking member formed on said gear cam, and said light-blocking member passes between the light-emitting element and the light-receiving element, whereby the operation signals can be detected.

4. The disc changer of claim 3, wherein said light-blocking member is a notched rib formed concentrically with said gear.

5. The disc changer of claim 2, wherein said identifying means is provided in a rearmost region with respect to a reference location of the gear cam, as a member for selecting one of said subtrays to be ejected.

* * * * *